US011325357B2

(12) United States Patent
Olsen et al.

(10) Patent No.: US 11,325,357 B2
(45) Date of Patent: May 10, 2022

(54) METHOD OF MAKING AN ANTIMICROBIAL MULTILAYER FILM

(71) Applicant: Cryovac, LLC, Charlotte, NC (US)

(72) Inventors: Jessica A. Olsen, Charlotte, NC (US); Anant Kondiram Parte, Charlotte, NC (US); Sonola Solanke Onasanya, Charlotte, NC (US); Sri Charan Yarlagadda, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/057,824

(22) PCT Filed: May 21, 2019

(86) PCT No.: PCT/US2019/033213
§ 371 (c)(1),
(2) Date: Nov. 23, 2020

(87) PCT Pub. No.: WO2019/226591
PCT Pub. Date: Nov. 28, 2019

(65) Prior Publication Data
US 2021/0213713 A1    Jul. 15, 2021

Related U.S. Application Data

(60) Provisional application No. 62/676,370, filed on May 25, 2018.

(51) Int. Cl.
| | | |
|---|---|---|
| *B32B 27/08* | (2006.01) | |
| *B32B 7/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 37/15* | (2006.01) | |
| *B29C 48/00* | (2019.01) | |
| *B29C 48/07* | (2019.01) | |
| *B29C 48/21* | (2019.01) | |
| *B29C 48/88* | (2019.01) | |
| *B29K 105/00* | (2006.01) | |
| *B29C 48/09* | (2019.01) | |
| *B29C 48/30* | (2019.01) | |
| *B29C 48/285* | (2019.01) | |
| *B29C 48/885* | (2019.01) | |
| *B29C 48/29* | (2019.01) | |

(52) U.S. Cl.
CPC ............ *B32B 27/08* (2013.01); *B29C 48/022* (2019.02); *B29C 48/07* (2019.02); *B29C 48/21* (2019.02); *B29C 48/88* (2019.02); *B29C 48/914* (2019.02); *B32B 7/12* (2013.01); *B32B 27/302* (2013.01); *B32B 27/32* (2013.01); *B32B 27/34* (2013.01); *B32B 27/365* (2013.01); *B32B 37/153* (2013.01); *B29C 48/0017* (2019.02); *B29C 48/0018* (2019.02); *B29C 48/0023* (2019.02); *B29C 48/09* (2019.02); *B29C 48/288* (2019.02); *B29C 48/29* (2019.02); *B29C 48/304* (2019.02); *B29C 48/885* (2019.02); *B29K 2105/0011* (2013.01); *B29K 2995/0049* (2013.01); *B29K 2995/0053* (2013.01); *B32B 2307/7145* (2013.01); *B32B 2307/7244* (2013.01); *B32B 2309/72* (2013.01); *B32B 2333/12* (2013.01); *B32B 2439/70* (2013.01)

(58) Field of Classification Search
CPC ......... B32B 27/08; B32B 7/12; B32B 27/302; B32B 27/32; B32B 27/34; B32B 27/364; B32B 27/365; B32B 37/153; B29C 48/88; B29C 48/022; B29C 48/914; B29C 48/07; B29C 48/21; B29C 35/16
See application file for complete search history.

(56) References Cited

U.S. PATENT DOCUMENTS

| | | | |
|---|---|---|---|
| 5,929,133 A | 7/1999 | Watanabe et al. | |
| 7,915,325 B2 | 3/2011 | Schiffmann et al. | |
| 9,332,751 B2 | 5/2016 | Unal et al. | |
| 2002/0064585 A1 | 5/2002 | Chrstianson et al. | |
| 2004/0018283 A1 | 1/2004 | Hirschey et al. | |
| 2004/0175473 A1 | 9/2004 | Nauth et al. | |
| 2007/0166344 A1 | 7/2007 | Qu et al. | |
| 2008/0220036 A1 | 9/2008 | Miltz et al. | |
| 2010/0173993 A1 | 7/2010 | Sawyer et al. | |
| 2012/0087968 A1* | 4/2012 | Ebner ..................... | A23B 4/20 424/412 |
| 2013/0025764 A1 | 1/2013 | Henderson | |
| 2015/0175336 A1 | 6/2015 | Morris et al. | |
| 2016/0325911 A1 | 11/2016 | Galet Domingo et al. | |
| 2018/0027829 A1 | 2/2018 | Elowe et al. | |

(Continued)

FOREIGN PATENT DOCUMENTS

| | | |
|---|---|---|
| CN | 101628645 | 1/2010 |
| CN | 104448525 | 3/2015 |
| CN | 105236014 | 1/2016 |

(Continued)

*Primary Examiner* — Stella K Yi

(74) *Attorney, Agent, or Firm* — Jason R. Womer

(57) ABSTRACT

The presently disclosed subject matter is generally directed to packaging materials having at least one antimicrobial agent and methods of making thereof. A multilayer film including a sealant layer with a polymeric substrate, a lauroyl arginate moiety, and an ethylene methacrylic acid copolymer is disclosed. Such packaging materials are suitable for use in the packaging of food products to control microbial contamination.

19 Claims, No Drawings

(56) References Cited

U.S. PATENT DOCUMENTS

2018/0042227 A1 2/2018 Felder et al.
2019/0161636 A1 5/2019 Gokhale

FOREIGN PATENT DOCUMENTS

| | | |
|---|---|---|
| CN | 204936396 | 1/2016 |
| EP | 0750853 | 1/1997 |
| KR | 20060027739 | 3/2006 |
| KR | 20100106043 | 10/2010 |
| KR | 101300645 | 8/2013 |
| KR | 101417767 | 7/2014 |
| KR | 101644839 | 8/2016 |
| WO | 2017027560 | 2/2017 |

\* cited by examiner

METHOD OF MAKING AN ANTIMICROBIAL MULTILAYER FILM

BACKGROUND

The present invention is in the technical field of multilayer films used for packaging. More particularly, the present invention is in the technical field of multilayer films comprising an antimicrobial agent.

During processing, preparation, and packaging, food products can encounter microorganisms that make the food unsuitable for consumption. The microorganisms can originate from the food itself, the food contact surfaces, and/or the surrounding environment. To this end, the safety of food products has been a subject of increasing concern as a result of several well-publicized outbreaks of food-borne pathogens in fresh and ready-to-eat foods. In the United States, food-borne illness affects about 6 to 80 million people per year, causing 9,000 deaths and an estimated cost of 5 billion dollars. It is therefore critical for food products to be processed, handled, and packaged in the safest manner possible to help reduce microbial contamination.

In addition, the risk of deviations in the overseas transport time and delays in custom clearance can potentially result in less shelf life of more than one week for the further processing companies or the end user of the food products. The reduction of microorganisms can extend the shelf life of food products.

The food industry has responded in various ways in an attempt to reduce microbial contamination. For example, aseptic packaging, pre-fill sterilization, and post-fill sterilization are commonly applied as possible microbial control methods. However, these methods often result in undesirable changes in food quality characteristics. In addition, fresh and minimally processed foods often cannot be preserved by such approaches and must rely on other methods.

Modified atmosphere packaging is another common strategy used by the food industry to extend the shelf life of food products, particularly fresh produce and/or meat. In modified atmosphere packaging, the rate of food deterioration is reduced by modifying the initial concentrations of oxygen and carbon dioxide inside the package. However, the modified gas concentrations change over time. Also, the absence of oxygen can affect freshness and flavor perception as well as encourage the growth of harmful anaerobic microorganisms.

The food industry has also attempted to incorporate antimicrobial agents directly in the food (e.g., preservatives such as BHT) as a means to control contamination. However, antimicrobial agents in or on foodstuffs are usually not acceptable to consumers, as they prefer natural foods and food components. Such additives can also accumulate above safe levels and affect color, flavor, and/or smell of the food product. In addition, it is difficult to formulate a composition that is effective at reducing microorganisms using ingredients that are acceptable for direct food contact according to government regulations.

In addition, prior attempts have been made to incorporate antimicrobial agents into or onto the packaging material surrounding the food item. In general, such attempts have been problematic. Particularly, antimicrobial agents are commonly rendered ineffective as a result of the high processing temperatures used to process typical packaging films or structures. In addition, antimicrobial agents can become immobilized within the polymer network of a film layer, reducing availability on the film surface.

Accordingly, there is a need in the art for improved products and methods to control microbial contamination.

SUMMARY

The present invention is directed to a method of making a multilayer film. The method may include providing a polymeric substrate, a lauroyl arginate moiety, and an ethylene methacrylic acid copolymer. The method may further include mixing the lauroyl arginate moiety, the ethylene methacrylic acid copolymer, and the polymeric substrate to make a blend. The method may also include extruding the blend of polymeric substrate, lauroyl arginate moiety, and ethylene methacrylic acid copolymer through a die to form an extrudate. The method may include forming a multilayer film. The multilayer film may have the lauroyl arginate moiety present in a sealant layer of the multilayer film in an amount of about 0.01% to about 15% by weight of the sealant layer. The multilayer film may have the ethylene methacrylic acid copolymer present in the sealant layer of the multilayer film in an amount of about 1% to about 20% by weight of the sealant layer.

Another embodiment of the present invention is directed to a method of reducing the microbial contamination of a product in a package. The method may include providing a multilayer film. The multilayer film may have a sealant layer with a polymeric substrate, a lauroyl arginate moiety, and an ethylene methacrylic acid copolymer. The method may also include forming a package from the multilayer film. The method may further include packaging the product in the multilayer film. The multilayer film may have the lauroyl arginate moiety present in a sealant layer of the multilayer film in an amount of about 0.01% to about 15% by weight of the sealant layer. The multilayer film may have the ethylene methacrylic acid copolymer present in the sealant layer of the multilayer film in an amount of about 1% to about 20% by weight of the sealant layer.

A further embodiment of the present invention is directed to a packaged product. The packaged product may include a product and a multilayer film at least partially surrounding the product. The multilayer film may have a sealant layer with a polymeric substrate, a lauroyl arginate moiety present in an amount of about 0.01% to about 15% by weight of the sealant layer. The multilayer film may have an ethylene methacrylic acid copolymer present in an amount of about 1% to about 20% by weight of the sealant layer.

DESCRIPTION OF EMBODIMENTS

The presently disclosed subject matter is generally directed to multilayer films and packaging materials comprising at least one antimicrobial agent and method of making thereof. Particularly, the disclosed packaging materials incorporate, via extrusion into a layer of the multilayer film, an antimicrobial agent based on the lauroyl arginate ("LAE") moiety. The antimicrobial agent may be incorporated via extrusion into the sealant layer of the disclosed packaging materials. Such packaging materials are suitable for use in the packaging of food products (such as fresh red meat, smoked foods, and processed foods) to control microbial contamination. The multilayer films and packaging materials may reduce spoilage bacteria in food applications where antimicrobial actives are needed to increase shelf life or protect food from spoilage.

While the following terms are believed to be understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" can refer to "one or more" when used in the subject specification, including the claims. Thus, for example, reference to "a film" can include a plurality of such films, and so forth.

Unless otherwise indicated, all numbers expressing quantities of components, conditions, and so forth used in the specification and claims are to be understood as being modified in all instances by the term "about".

Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments ±20%, in some embodiments ±10%, in some embodiments ±5%, in some embodiments ±1%, in some embodiments ±0.5%, in some embodiments to ±0.1%, and in some embodiments to ±0.01%, from the specified amount, as such variations are appropriate in the disclosed materials and methods.

As used herein, the term "abuse layer" can refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal. In some embodiments, the abuse layer can comprise polyamide, ethylene/propylene copolymer, and/or combinations thereof.

As used herein, the term "antimicrobial" refers to microbicidal activity or microbe growth inhibition in a microbe population. In some embodiments, the term "anti-microbial" can refer to a greater than 1 log reduction; in some embodiments, a greater than 2 log reduction; in some embodiments, a greater than 3 log reduction; and in some embodiments, a greater than 4 log reduction in the growth of a population of microbes relative to a control.

As used herein, the terms "barrier" and/or "barrier layer" can refer to the ability of a film or film layer to serve as a barrier to one or more gases. For example, oxygen barrier layers can comprise, but are not limited to, ethylene/vinyl alcohol copolymer, polyvinyl chloride, polyvinylidene chloride, polyamide, polyester, polyacrylonitrile, and the like, as known to those of ordinary skill in the art.

As used herein, the term "bulk layer" can refer to any layer of a film that is present for the purpose of increasing the abuse-resistance, toughness, and/or modulus of a film. In some embodiments, bulk layers can comprise polyolefin, ethylene/alpha-olefin copolymer, ethylene/alpha-olefin copolymer plastomer, low density polyethylene, linear low density polyethylene, and combinations thereof.

As used herein, the term "extrusion" is used with reference to the process of forming continuous shapes by forcing a molten plastic material through a die, followed by cooling or chemical hardening. Immediately prior to extrusion through the die, the polymeric material is fed into a rotating screw of variable pitch, i.e., an extruder that forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the term "copolymer" can refer to polymers formed by the polymerization reaction of at least two different monomers. For example, the term "copolymer" can include the copolymerization reaction product of ethylene and an alpha-olefin, such as 1-hexene. However, in some embodiments the term "copolymer" can include, for example, the copolymerization of a mixture of ethylene, propylene, 1-hexene, and 1-octene.

As used herein, the terms "core" and "core layer" can refer to any internal film layer that has a primary function other than serving as an adhesive or compatibilizer for adhering two layers to one another. In some embodiments, the core layer or layers provide a multilayer film with a desired quality, such as level of strength, modulus, optics, added abuse resistance, and/or specific impermeability.

As used herein, the term "film" can include, but is not limited to, a laminate, sheet, web, coating, and/or the like, that can be used to package a product. The film can be a rigid, semi-rigid, or flexible product. In some embodiments, the multilayer film is produced as a fully coextruded film, i.e., all layers of the film emerging from a single die at the same time. In some embodiments, the film is made using a flat cast film production process or a round cast film production process. Alternatively, the film can be made using a blown film process in some embodiments.

As used herein, the terms "heat shrink" and "heat-shrinkable" refer to the tendency of a film to shrink upon the application of heat such that the size (area) of the film decreases while the film is in an unrestrained state. Likewise, the tension of a heat-shrinkable film increases upon the application of heat if the film is restrained from shrinking.

The term "kill rate" as used herein refers to the number of microorganisms over time that the disclosed multilayer film can effectively kill or inactivate.

As used herein, the term "LAE" refers to lauroyl arginate.

As used herein, the term "LAE HCl" refers to ethyl lauroyl arginate hydrochloride salt.

As used herein, the term "machine direction" ("MD"), refers to a direction along the length of the film, i.e., in the direction of the film as the film is formed during extrusion.

As used herein, the term "meat" refers to any myoglobin-containing or hemoglobin-containing tissue from an animal, such as beef, pork, veal, lamb, mutton, chicken or turkey; and game such as venison, quail, and duck. The meat can be in a variety of forms including primal cuts, subprimal cuts, and/or retail cuts as well as ground, comminuted, or mixed. The meat or meat product is preferably fresh, raw, uncooked meat, but can also be frozen, hard chilled, or thawed. In some embodiments, the meat can be subjected to other irradiative, biological, chemical and/or physical treatments. Examples may include smoking the meat or processing the meat. The suitability of any particular such treatment can be determined without undue experimentation in view of the present disclosure.

As used herein, the term "microbe" or "microorganism" refers to any organism capable of contaminating meat, food, or other products, thereby making such product unsuitable or unhealthy for human or animal consumption or contact. For example, in some embodiments, microbes can include bacteria, fungi, yeasts, algae, molds, mycoplasmids, protozoa, viruses, and the like.

As used herein, the term "moiety" refers to a specific segment or functional group of a molecule. In some embodiments, the term "moiety" can include derivatives.

As used herein, the term "multilayer film" can refer to a thermoplastic film having one or more layers formed from polymeric or other materials that are bonded together by any conventional or suitable method, including one or more of the following methods: coextrusion, extrusion coating, lamination, vapor deposition coating, solvent coating, emulsion coating, or suspension coating.

The term "oriented" as used herein refers to a polymer-containing material that has been stretched at the softening temperature but below the melting temperature, followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions.

As used herein, the term "oxygen-impermeable," or "barrier" and the phrase "oxygen-impermeable layer" or "barrier layer," as applied to films and/or layers, is used with reference to the ability of a film or layer to serve as a barrier to one or more gases (i.e., gaseous $O_2$). Such barrier materials can include (but are not limited to) ethylene/vinyl alcohol copolymer, polyvinyl alcohol homopolymer, polyvinyl chloride, homopolymer and copolymers of polyvinylidene chloride, polyalkylene carbonate, polyamide, polyethylene naphthalate, polyester, polyacrylonitrile, homopolymer and copolymers, liquid crystal polymer, SiOx, carbon, metal, metal oxide, and the like, as known to those of ordinary skill in the art. In some embodiments, the oxygen impermeable film or layer has an oxygen transmission rate of no more than 100 cc $O_2/m^2 \cdot day \cdot atm$; in some embodiments, less than 50 cc $O_2/m^2 \cdot day \cdot atm$; in some embodiments, less than 25 cc $O_2/m^2 \cdot day \cdot atm$; in some embodiments, less than 10 cc $O_2/m^2 \cdot day \cdot atm$; in some embodiments, less than 5 cc $O_2/m^2 \cdot day \cdot atm$; and in some embodiments, less than 1 cc $O_2/m \cdot day \cdot atm$ (tested at 1 mil thick and at 25° C. in accordance with ASTM 03985, herein incorporated by reference in its entirety).

As used herein, the term "oxygen-permeable" as applied to films and/or film layers refers to a film packaging material that can permit the transfer of oxygen from the exterior of the film (i.e., the side of the film not in contact with the packaged product) to the interior of the film (i.e., the side of the film in contact with the packaged product). In some embodiments, "oxygen-permeable" can refer to films or layers that have a gas (e.g., oxygen) transmission rate of at least about 1,000 cc/m2/24 hrs/atm at 73° F.; in some embodiments, at least about 5,000 cc/m2/24 hrs/atm at 73° F.; in some embodiments, at least about 10,000 cc/m2/24 hrs/atm at 73° F.; in some embodiments, at least about 50,000 cc/m2/24 hrs/atm at 73° F.; and in some embodiments, at least about 100,000 cc/m2/24 hrs/atm at 73° F. The term "permeable" can also refer to films that do not have high gas permeability, but that are sufficiently permeable to affect a sufficiently rapid bloom for the particular product and particular end-use application.

As used herein, the term "package" refers to packaging materials configured around a product being packaged. In some embodiments, the phrase "packaged product," as used herein, refers to the combination of a product that is surrounded by a packaging material.

As used herein, the term "polymer" can refer to the product of a polymerization reaction, and can be inclusive of homopolymers, copolymers, terpolymers, and the like. In some embodiments, the layers of a film can consist essentially of a single polymer, or can have still additional polymers together therewith, i.e., blended therewith. The term "polymeric" can be used to describe a polymer-containing material (i.e., a polymeric film).

The term "polymeric substrate" as used herein refers to the polymeric components of a film layer that represent the majority (by weight) of the film. For example, the sealant layer of the disclosed film may have a polymeric substrate (e.g. polyester, polyamide, and/or polystyrene) in addition to a lauroyl arginate moiety and ethylene methacrylic acid copolymer. The term "resin" may be used interchangeably with "polymeric substrate".

The term "polyolefin" as used herein refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and a non-olefinic co-monomer co-polymerizable with the olefin, such as vinyl monomers, modified polymers thereof, and the like. Specific examples include polyethylene homopolymer, polypropylene homopolymer, polybutene homopolymer, ethylene-alpha-olefin copolymer, propylene-alpha-olefin copolymer, butene-alpha-olefin copolymer, ethylene-unsaturated ester copolymer, ethylene-unsaturated acid copolymer, (e.g. ethylene-ethyl acrylate copolymer, ethylene-butyl acrylate copolymer, ethylene-methyl acrylate copolymer, ethylene-acrylic acid copolymer, and ethylene-methacrylic acid copolymer), ethylene-vinyl acetate copolymer, ionomer resin, polymethylpentene, etc.

The term "red meat" as used herein refers to any meat or meat product having a red color when freshly cut. Such meat or meat product can include (but is not limited to) beef, pork, veal, lamb, mutton, or products thereof.

As used herein, the term "seal" can refer to any seal of a first region of a film surface to a second region of a film or substrate surface. In some embodiments, the seal can be formed by heating the regions to at least their respective seal initiation temperatures using a heated bar, hot air, infrared radiation, ultrasonic sealing, and the like. In some embodiments, the seal can be formed by an adhesive.

As used herein, the terms "seal layer", "sealing layer", "heat seal layer", and/or "sealant layer" refer to an outer film layer or layers involved in heat sealing of the film to itself, another film layer of the same or another film, and/or another article that is nota film. Heat sealing can be performed by any one or more of a wide variety of manners known to those of ordinary skill in art, including using heat seal technique (e.g., melt-bead sealing, thermal sealing, impulse sealing, ultrasonic sealing, hot air, hot wire, infrared radiation, and the like).

As used herein, the term "tie layer" can refer to any internal film layer having the primary purpose of adhering two layers to one another. In some embodiments, the tie layers can comprise any nonpolar polymer having a polar group grafted thereon, such that the polymer is capable of covalent bonding to polar polymers such as polyamide and ethylene/vinyl alcohol copolymer. In some embodiments, the tie layers can comprise, but are not limited to, modified polyolefin, modified ethylene/vinyl acetate copolymer, and/or homogeneous ethylene/alpha-olefin copolymer.

As used herein, the term "transverse direction" ("TO") refers to a direction across a film, perpendicular to the machine or longitudinal direction.

All compositional percentages used herein are presented on a "by weight" basis, unless designated otherwise.

The multilayer film can be monolayer or multilayer. To this end, the multilayer film can comprise 1 to 20 layers; in some embodiments, from 2 to 12 layers; in some embodiments, from 2 to 9 layers; and in some embodiments, from 3 to 8 layers. Thus, in some embodiments, the multilayer film can have 1, 2, 3, 4, 5, 6, 7, 8, 9, 10, 11, 12, 13, 14, 15, 16, 17, 18, 19, or 20 layers.

The multilayer film may have any total thickness as long as the film provides the desired properties for the particular packaging operation in which it is to be used. Nevertheless, in some embodiments the multilayer film has a total thickness ranging from about 0.1 mil to about 15 mils; in some embodiments, from about 0.2 mil to about 10 mils; and in some embodiments, from about 0.3 mils to about 5.0 mils.

In some embodiments, the presently multilayer film exhibits a sufficient Young's modulus so as to withstand normal handling and use conditions. In some embodiments, the film has a Young's modulus of at least about 200 MPa; in some embodiments, at least about 230 MPa; in some embodiments, at least about 260 MPa; in some embodiments, at least about 300 MPa; in some embodiments, at least about 330 MPa; in some embodiments, at least about 360 MPa; and in some embodiments, at least about 400 MPa. As would be apparent those of ordinary skill in the art, Young's modulus is measured in accordance with ASTM D-882, which is hereby incorporated by reference.

Sealant Layer

As set forth above, the sealant layer of the multilayer film comprises an antimicrobial agent. The antimicrobial agent may be 2-phenylphenol, 5-Chloro-2-methyl-4-isothiazolin-3-one, 2-methyl-4-isothiazolin-3-one, ascorbic acid, ascorbyl palmitate, benzoic acid, butylated hydroxytoluene, boric acid, choline chloride, lauroyl arginate (LAE) moiety, methyl paraben, octenyl succinic anhydride, lactic acid, sodium lactate, sodium acetate, sodium diacetate, sorbic acid, tert-butyl hydroquinone, trichlorocarbanilide, triclosan, or combinations thereof. In some embodiments, the antimicrobial agent may be based on the cationic lauroyl arginate moiety. As a result, the multilayer film exhibits an antimicrobial effect, i.e., it is capable of destroying or inhibiting the growth of microorganisms. While not intended to be bound by any theory, antimicrobial activity of LAE is believed to be due to the cationic surfactant properties of its active ingredient (ethyl-Nα-Iauroyl-L-arginate). Cationic surfactants are known to disrupt the integrity of cell membranes in a broad spectrum of bacteria, yeasts, and molds.

While any suitable lauroyl arginate derivative can be used, particularly useful lauroyl arginate moieties include (but are not limited to) ethyl n-lauroyl-L-arginate hydrochloride salt ("LAE HCl") and ethyl n-lauroyl-L-arginate laurate complex ("LAE monolaurate"). In addition, the anionic component can be comprised of anions of numerous organic or inorganic molecules. For example, complexes can be formed from LAE, such as LAE palmitate, LAE stearate, LAE lactate, LAE citrate, LAE oleate, LAE benzoate, LAE acetate, LAE hydrogen sulfate, LAE phosphonate, and the like. In some embodiments, the LAE moiety may be ethyl lauroyl arginate hydrochloride salt, lauroyl arginate monolaurate, lauroyl arginate palmitate, lauroyl arginate stearate, lauroyl arginate lactate, lauroyl arginate citrate, lauroyl arginate oleate, ethyl lauroyl arginate benzoate, ethyl lauroyl arginate acetate, ethyl lauroyl arginate hydrogen sulfate, ethyl lauroyl arginate phosphonate, or combinations thereof.

Examples of commercially available LAE moieties include Mirenat®-N (available from Vedeqsa. Inc., New York, N.Y., United States of America) and CytoGuard LA® (available from A&B Ingredients, Fairfield, N.J., United States of America). See, for example, U.S. Patent Application Publication No. 2010/0173993, the entire disclosure of which is hereby incorporated by reference.

Advantageously, the LAE moieties disclosed above have been approved in the United States for spraying in food applications. To this end, the LAE moieties are non-toxic, non-allergenic, and have been determined to be harmless to human and/or animal health. Continuing, the LAE moieties are effective against a broad range of microorganisms without destroying or damaging meat or produce tissues. Importantly, it has been shown that LAE moieties also do not impart any off-tastes, odors, or changes in color. In addition. LAE moieties are stable at a wide range of temperatures, lighting, and environmental conditions.

In some embodiments, the sealant layer may have about 0.01% to about 15% LAE moiety. In some embodiments, the sealant layer may have 0.5% to 10% LAE moiety. In other embodiments, the sealant layer may have 1% to 5% LAE moiety. The LAE moiety may be present in the sealant layer in an amount of 0.5%, 1%, 2%, 3%, 4%, 5%, 6%, 7%, 8%, 9%, 10%, or any range between these values. In other embodiments, the sealant layer may have 3% LAE moiety.

In some embodiments, the sealant layer includes up to 5% by weight sorbitol. In other embodiments the sealant layer includes between 0.1% and 5% by weight sorbitol, between 0.1% and 2% by weight sorbitol, between 0.1% and 1% by weight sorbitol or between 0.3% and 0.7% by weight sorbitol.

In some embodiments, the sealant layer may have a polymeric substrate. In other embodiments, the sealant layer may have one or more polymeric substrates. For example, in some embodiments, the sealant layer may additionally have one or more of the following: very low density polyethylene (VLDPE), high density polyethylene (HDPE), polyolefins (including homopolymers and copolymers such as, e.g., low density polyethylene (LDPE), medium density polyethylene (MDPE), linear low density polyethylene (LLDPE), polypropylene homopolymers and copolymers, and higher homologues), styrene homopolymers and copolymers (such as polystyrene, styrene maleic anhydride copolymer, styrene acrylonitrile copolymer, and acrylonitrile butadiene styrene copolymer), alkene-vinyl carboxylate copolymers (such as, e.g., ethylene-vinyl acetate copolymers), alkene-methacrylic acid copolymers (such as, e.g., ethylene-acrylic acid copolymers), alkene-alkyl methacrylate copolymers (such as ethylene-methyl methacrylate copolymers), alkene-vinyl alcohol copolymers (such as, e.g., ethylene-vinyl alcohol copolymers), alkene-vinyl chloride copolymers (such as, e.g., ethylene-vinyl chloride copolymers), polycarbonates, polyamides, polyurethanes, polysulfones, poly(vinylidene chlorides), poly(vinyl chlorides), ionomers based on alkali metal or zinc salts of alkene-methacrylic acid copolymers, (meth)acrylate homopolymers and copolymers, fluoropolymers, thermoplastic polyesters, and mixtures of any of the foregoing polymers. Thus, in some embodiments, the sealant layer of the multilayer film can comprise blends of a linear low density polyethylene with a very low density polyethylene, ionomers, or blends of various polyamides in addition to the LAE moiety. In some embodiments, the polymeric substrate may be polyolefin, polyolefin copolymers, polyester, polyamide, polystyrene, polycarbonate, or combinations thereof. In some embodiments, the polymeric substrate may be devoid of water soluble, partially water-insoluble, or water-swellable polymers.

The sealant layer may have 70% to 99% polymeric substrate. The sealant layer may have 70%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, polymeric substrate, or any range between these values. In some embodiments, the sealant layer may have 77% polymeric substrate. In other embodiments, the sealant layer may have 87% polymeric substrate. In further embodiments, the sealant layer may have 92% polymeric substrate. In some embodiments, the sealant layer may have 97% polymeric substrate.

It was found that extruding LAE could be improved with the use of additives. The additives that show effective improvements in processability of LAE in polyethylene (PE) contain either charged or polar structures. The most effective material tested was ethylene methacrylic acid copolymer (EMAA). Ethylene-vinyl acetate also showed improvements in processing. In a laboratory setting, a screening test may be done with the Intellitorque Brabender® Plastogram to measure the torque before and after addition of LAE in PE. During the screening test, the initial torque was measured of the polymeric substrate before the mixing of the lauroyl arginate moiety and ethylene methacrylic acid copolymer with the polymeric substrate and the final torque was measured after mixing the lauroyl arginate moiety, ethylene methacrylic acid copolymer, and the polymeric substrate. The initial torque was lower than the final torque during this screening test.

The extrusion of LAE in PE on a large manufacturing scale resulted in processing difficulty. Due to the difficulty of processing LAE in PE, the torque and head pressure during extrusion of the lauroyl arginate moiety and the polymeric substrate could not be measured. The torque and head pressure of the polymeric substrate during extrusion of the lauroyl arginate moiety and ethylene methacrylic acid copolymer with the polymeric substrate may be measured. With the use of EMAA, the torque and head pressure would increase during extrusion of LAE into the polymeric substrate (carrier resin). In some embodiments, the addition of EMAA allowed the torque to increase after mixing the polymeric substrate, LAE moiety, and EMAA. The increase in torque may indicate the ingredients are mixing well.

In other embodiments, the sealant layer may also include an ethylene methacrylic acid copolymer (EMAA) and/or ionomers thereof. The EMAA may have additional ions. The ions may be zinc (Zn), sodium (Na), and/or silica. The ions may be used to neutralize the copolymer. The EMAA may also be blended with additional components. The additional components may include ethylene-vinyl acetate (EVA), polybutylene (PB), polyamide (PA), amide wax, slip additive, antilock, or combinations thereof.

The sealant layer may have about 1% to about 20% EMAA. The sealant layer may have 1%, 2%, 3%, 4%, 5%, 6%, 7%, 8%, 9%, 10%, 11%, 12%, 13%, 14%, 15%, 16%, 17%, 18%, 19%, 20% EMAA, or any range between these values. In some embodiments, the sealant layer may have 5% EMAA. In other embodiments, the sealant layer may have 10% EMAA. In further embodiments, the sealant layer may have 15% EMAA.

In some embodiments, the sealant layer can additionally comprise an antiblock additive, as would be known to those of ordinary skill in the art. For example, suitable antiblock additives can include (but are not limited to): natural silica (such as diatomaceous earth), synthetic silica, glass spheres, acrylic polymer, silicone resin microbeads, zeolites, ceramic particles, and the like. As would be well understood to those of ordinary skill in the art, the amount of antiblock used in the sealant layer can be varied for particular formulations and processing conditions (such as, for example, about 0.5% to about 15% by weight of the antiblock additive used).

Other Layers

The presently disclosed multilayer film may optionally have additional layers. Examples of such layers include (but are not limited to) barrier layers, abuse layers, core layers, tie layers, bulk layers, and the like. Those of ordinary skill in the art are aware of the plethora of polymers and polymer blends that can be included in each of the foregoing layers. Regardless of the particular structure of a given multilayer film, it can be used as a packaging material in accordance with the presently disclosed subject matter.

Thus, in some embodiments, the multilayer film may have a barrier layer. In some embodiments, the barrier layer may have a low permeance to oxygen (i.e., no more than about 150 cm3/m2 atm 24 hours at 25° C. and 0% Relative Humidity). In some embodiments, the barrier layer may include ethylene vinyl alcohol (EVOH), nylon, polyvinylidene chloride (PVDC), polyethylene carbonate, polyamide, polyester, polyvinyl alcohol, acrylonitrile-butadiene copolymer, polyalkylene carbonate, polyacrylonitrile, polypropylene homopolymer or copolymer having a melting point of greater than about 145° C. (as measured by DSC), and polyethylene having a density greater than about 0.95 g/cc, or combinations thereof.

The multilayer film may include at least one core layer. The at least one core layer may have a primary function other than serving as an adhesive or compatibilizer for adhering two layers to one another. In some embodiments, the at least one core layer may provide the multilayer film with a desired quality, such as level of strength, modulus, optics, added abuse resistance, and/or specific impermeability. The core layer may also be referred to as a bulk layer. The core layer may include one or more polymers that include mer units derived from at least one of a C2-C12alpha-olefin, styrene, amides, esters, urethanes, or combinations thereof. Preferred among these are those homo- and co-polymers (including terpolymers, etc.) that include mer units derived from ethylene, propylene, and 1-butene, even more preferably an ethylene copolymer such as, for example, ethylene/C3-C8a-olefin copolymer, ethylene/ethylenically unsaturated ester copolymer (e.g., ethylene/butyl acrylate copolymer), ethylene/ethylenically unsaturated acid copolymer (e.g., ethylene/(meth)acrylic acid copolymer), and ethylene/vinyl acetate copolymer. The core layer may have ethylene/C3-C8a-olefin copolymer, ethylene/ethylenically unsaturated ester copolymer (e.g., ethylene/butyl acrylate copolymer), ethylene/ethylenically unsaturated acid copolymer (e.g., ethylene(meth)acrylic acid copolymer), ethylene/vinyl acetate copolymer, or combinations thereof. In some embodiments, the at least one core layer may have ethylene vinyl acetate (EVA) and VLDPE. The EVA may be modified.

In some embodiments, the at least one core layer may have 15% ethylene vinyl acetate (EVA) and 85% VLDPE. In other embodiments, the at least one core layer may have 70% ethylene vinyl acetate (EVA) and 30% VLDPE.

In some embodiments, the multilayer film may have at least one tie layer. The composition, number, and thickness of the tie layers are known to those of ordinary skill in the art. Such tie layers can include (but are not limited to) one or more polymers that contain mer units derived from at least one of the following: C2-C12 alpha-olefin, styrene, amide, ester, and urethane. The multilayer film may have 1, 2, 3, 4, 5, 6, or 7 tie layers.

The at least one tie layer have the primary purpose of improving the adherence of two layers to each other. Tie layers may include polymers having grafted polar groups so that the polymer is capable of covalently bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Examples of tie layer polymers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

In an embodiment, the multilayer film includes a tie layer in direct contact with the sealant layer. The tie layer included between 1% and 10% by weight of a cyclic olefin copolymer. In one embodiment the tie layer includes between 2% and 6% by weight of a cyclic olefin copolymer. In one embodiment the tie layer includes between 3% and 5% by weight of a cyclic olefin copolymer. In an embodiment, the cyclic olefin copolymer of this paragraph is an ethylene/norbornene copolymer.

The multilayer film may have one or more bulk layers to increase the thickness and thereby the abuse-resistance, toughness, modulus, etc. of the overall multilayer film structure. In some embodiments, the bulk layer can include (but is not limited to) a polyolefin, such as an ethylene homopolymer or copolymer.

Additionally, in some embodiments, the multilayer film may have an abuse layer. In some embodiments, the abuse layer comprises one or more polymers that serve to resist abrasion, puncture, and other potential causes of reduction of package integrity, as well as potential causes of reduction of package appearance quality. Polymers suitable for use in the abuse layer can include (but are not limited to) one or more of the following: polyester, polyamide, polyethyleneterephthalate (PET), polyurethane, polystyrene, and polyolefin.

Various combinations of layers can be used in the formation of a multilayer film in accordance with the presently disclosed subject matter. The following are several non-limiting examples of combinations, wherein letters are used to represent film layers: S/A, S/B/A, S/C/A, S/C/A/A, S/T/C/T/A, S/T/T/C/T/T/A, SMC/TT/A, S/T/T/C/T/A, S/A/S, S/C/S, S/T/B/T/A, S/T/T/B/T/T/A, S/T/B/T/T/A, S/T/T/B/T/A, S/C/T/B/T/C/A, S/C/T/B/T/C/T/A, S/C/T/B/T/T/C/T/A, S/A/T/B/T/A, S/A/T/C/T/A wherein S represents a sealant layer: C represents a core layer; T represents a tie layer, B represents a barrier layer: A represents abuse layers. One or more tie layers ("T") can be used between any one or more layers of in any of the above multilayer film structures.

The antimicrobial agent may be in any of the layers of the multilayer film. In some embodiments, the antimicrobial agent may be in the barrier layer. In other embodiments, the antimicrobial agent may be in the core layer. In further embodiments, the antimicrobial agent may be in the tie layer. In some embodiments, the antimicrobial agent may be in the abuse layer. The antimicrobial agent may be in more than one layer of the multilayer film. The antimicrobial agent may migrate from one layer to another layer. In some embodiments, the antimicrobial agent may be an LAE moiety.

Regardless of the structure of the multilayer film, one or more conventional packaging film additives can be included therein. Examples of additives that can be incorporated include (but are not limited to): antiblocking agents, antifogging agents, slip agents, colorants, flavorants, meat preservatives, stabilizers, antioxidants, UV absorbers, cross-linking enhancers, cross-linking inhibitors, and the like, as would be well understood to those of ordinary skill in the art.

The method of making a multilayer film may include providing a polymeric substrate, a lauroyl arginate (LAE) moiety, and ethylene methacrylic acid copolymer (EMAA). The LAE moiety and EMAA may be provided at the same time. In some embodiments, the LAE moiety and EMAA may be provided at different times.

The polymeric substrate may be a polyolefin, polyolefin copolymers, polyester, polyamide, polystyrene, polycarbonate, or combinations thereof. The polymeric substrate may be LDPE. In some embodiments, the polymeric substrate may be VLDPE. In other embodiments, the polymeric substrate may be LLDPE.

The LAE moiety may be ethyl lauroyl arginate hydrochloride salt, lauroyl arginate monolaurate, lauroyl arginate palmitate, lauroyl arginate stearate, lauroyl arginate lactate, lauroyl arginate citrate, lauroyl arginate oleate, ethyl lauroyl arginate benzoate, ethyl lauroyl arginate acetate, ethyl lauroyl arginate hydrogen sulfate, ethyl lauroyl arginate phosphonate, or combinations thereof. In some embodiments, the LAE moiety may be Lauroyl-L-arginine.

In some embodiments, the method of making a multilayer film may include mixing the lauroyl arginate moiety, the ethylene methacrylic acid copolymer, and the polymeric substrate to make a blend. In some embodiments, a single screw or twin-screw extruder may be used to blend the components. The polymeric substrate may be fed into the blender and stabilized. An additive may be added before the polymeric substrate is stabilized. The LAE moiety may be added after the polymeric substrate has stabilized. The LAE moiety may be added before the polymeric substrate has stabilized. The EMAA may be added after the polymeric substrate has stabilized. The EMAA may be added before the polymeric substrate has stabilized. The EMAA may be before the LAE moiety. The EMAA may be added after the LAE moiety. The EMAA may be added at the same time as the LAE moiety.

In some embodiments, the method of making a multilayer film may include extruding the blend of polymeric substrate, lauroyl arginate moiety, and the ethylene methacrylic acid copolymer through a die to form an extrudate.

In some embodiments, the method of making a multilayer film may include forming a multilayer film. The lauroyl arginate moiety may be present in a sealant layer of the multilayer film in an amount of about 0.01% to about 15% by weight of the sealant layer. The ethylene methacrylic acid copolymer may be present in the sealant layer of the multilayer film in an amount of about 1% to about 20% by weight of the sealant layer.

The method of making a multilayer film may include casting the extrudate onto a chilled roller so that the extrudate cools to form a cast film or orienting the extrudate as it cools and solidifies such that a film is formed.

The method of making a multilayer film may include measuring the initial torque of the polymeric substrate before the mixing of the lauroyl arginate moiety and ethylene methacrylic acid with the polymeric substrate and measuring the final torque after mixing the lauroyl arginate moiety, ethylene methacrylic acid, and the polymeric substrate, wherein the initial torque is lower than the final torque.

The presently multilayer film can be constructed using any of a wide variety of conventional techniques well-known in the art. For example, in some embodiments, the film can be produced using a hot blown process, wherein the film is extruded through an annular die and immediately blown to a desired diameter that results in a desired film thickness while the polymer is at or near its melt temperature. Such hot blown films are not considered to be heat-shrinkable because the amount of heat-shrinkability is not high enough to provide the shrink character typically required of heat-shrinkable films. Although hot blown films are oriented, the orientation occurs in the molten state, without producing the orientation-induced stress that renders the film heat-shrinkable.

Alternatively, in some embodiments, the multilayer film can be constructed using a cast process. Particularly, the film can be cast from a slot die with the extrudate being quenched by immediately contacting a chilled roll, resulting in solidification and cooling, followed by being reheated to a temperature below the melt point (preferably to the softening point of the polymer), followed by solid-state orientation using a tenter frame. Alternatively, the film can be formed by downward casting from an annular die, with the resulting annular "tape" being quenched using cascading water, cooled air (or other gas), or even ambient air. The resulting solidified and cooled annular tape is then reheated to a desired orientation temperature and oriented while in the solid state, using a trapped bubble.

Where the multilayer film has more than one layer, preparation of the multilayer film may be affected by coextrusion. Particularly, the film can be prepared by the simultaneous coextrusion of the respective film-forming layers through independent orifices of a multi-orifice die, and thereafter uniting the still molten layers. Alternatively, the film can be prepared by a single-channel coextrusion in which molten streams of the respective polymers are first united within a channel leading to a die manifold, and thereafter extruded together from the die orifice under conditions of streamline flow without intermixing thereby to produce a multi-layer polymeric film that can be oriented and heat-set. In addition, formation of a multi-layer film can also be affected by conventional lamination techniques, such as by laminating together a preformed first layer and a preformed second layer, or by casting the first layer onto a preformed second layer.

Optionally, the multilayer film may be sequentially or biaxially oriented. Particularly, orienting involves initially cooling an extruded film to a solid state (by, for example, cascading water or chilled air quenching) followed by reheating the film to within its orientation temperature range and stretching it. The stretching step can be accomplished in many ways such as by, for example, "blown bubble" or "tenter framing" techniques, both of which are well known to those skilled in the art. After being heated and stretched, the film is quenched rapidly while being maintained in its stretched configuration so as to set or lock in the oriented molecular configuration. An oriented film can be annealed to reduce or completely eliminate free shrink in one or more directions.

In some embodiments, if the film is oriented, it is subsequently annealed or heat set. That is, following orientation and cooling, the film can be reheated to or near its orientation temperature (either in a constrained or non constrained configuration) to dimensionally stabilize the film and to impart desirable mechanical properties.

In some embodiments, the multilayer film can be partially or wholly cross-linked. To produce cross-linking, an extrudate can be treated with a suitable radiation dosage of high-energy electrons (using an electron accelerator, Van der Graaf generator, and/or a resonating transformer) with the dosage level determined by standard dosimetry methods. One of ordinary skill in the art would understand that the radiation is not limited to electrons from an accelerator since any ionizing radiation can be used. In some embodiments, a suitable radiation dosage of high energy electrons can be about 10 to about 140 kGreys; in some embodiments, from about 20 to about 100 kGreys; and in some embodiments, from about 30 to about 80 kGreys.

In some embodiments, the multilayer film can be heat-shrinkable. The shrinkage characteristics of a film are determined by the stretch ratios and heat-setting conditions employed during its manufacture, as is well known in the art. In general, the shrinkage behavior of a film that has not been heat-set corresponds to the degree to which the film has been stretched during its manufacture. In the absence of heat-setting, a film that has been stretched to a high degree will exhibit a high degree of shrinkage when subsequently exposed to heat; a film which has only been stretched by a small amount will only exhibit a small amount of shrinkage. Heat-setting has the effect of providing dimensional stability to a stretched film, and "locking" the film in its stretched state. Thus, the shrinkage behavior of a film under the action of heat depends on whether, and to what extent, the film was heat-set after the stretching operation(s) effected during its manufacture.

In some embodiments, the multilayer film can be printed. In the simplest cases, the multilayer film can be printed using black letters with the product identification and the instructions for correct product storage or use. Alternatively, in the most complex cases, the multilayer film can comprise designs of various colors, product advertising, and/or production information. To improve print adhesion, in some embodiments the multilayer film can be primed using a coating of a resin that improves adhesion, gloss, and/or durability of the print. In some embodiments, the printed surface of the film can be rendered more receptive to ink by subjecting it to a corona discharge treatment or to any other treatment that is known to increase surface energy, such as flame treatment, as would be apparent to those of ordinary skill in the art.

As well known in the art, the LAE materials can vary in physical property from liquids to waxes to hard solids. Accordingly, the LAE material can be added to the sealant layer of the multilayer film using a variety of methods. Particularly, one method is to directly, gravimetrically feed the LAE solid at the desired concentration into the sealant resin extruders using standard blenders and feeders. The LAE material melts in the barrel of the extruder, along with the sealant resin pellets and becomes uniformly distributed into the melt at the desired concentration. Such methods work well in embodiments wherein the LAE material is a hard solid, such as a pellet or powder.

Alternatively, in some embodiments, the LAE material can be added to a side stuffer or other extruder port further down the barrel to limit the total residence time and heat exposure.

Further, in some embodiments, the LAE material can be melted and liquidly injected into the extruder at the desired concentration. Such methods are beneficial in embodiments wherein the LAE material is soft and/or waxy.

In addition, in some embodiments, a masterbatch of the LAE material can be prepared in a suitable resin at a higher loading level using extrusion techniques such as the three methods disclosed above. The masterbatch is then blended with additional sealant resins. Such a process allows for more precise metering of the additive at very low levels.

Accordingly, the EMAA material may be added to the sealant layer of the multilayer film using a variety of methods. Particularly, one method is to directly, gravimetrically feed the EMAA solid at the desired concentration into the sealant resin extruders using standard blenders and feeders. The EMAA material melts in the barrel of the extruder, along with the sealant resin pellets and becomes uniformly distributed into the melt at the desired concentration.

In addition, in some embodiments, a masterbatch of the EMAA material may be prepared in a suitable resin at a higher loading level using extrusion techniques such as the three methods disclosed above. The masterbatch may then be blended with additional sealant resins. Such a process allows for more precise metering of the additive at very low levels.

It has been discovered that microorganisms on food products can be controlled by packaging the product in a multilayer film of the type disclosed herein above (i.e., a film comprising a polymeric substrate, an LAE moiety, and ethylene methacrylic acid copolymer incorporated into the sealant layer of the film). Thus, when a product is packaged in the multilayer film, the initial contact with the film reduces the number of microorganisms on the surface of the product on contact. In addition, by allowing the film to remain in contact with the product during packaging, the antimicrobial composition can reduce the number of microorganisms on the food product between the initial application and packaging if the food product becomes re-contaminated. As a result, pathogenic or spoilage microorganisms in the product are controlled (i.e., the number of microbes is reduced compared to products packaged in films lacking an antimicrobial agent).

In some embodiments, the microorganism may be *E. coli, brochothrix thermosphacta, carnobacterium divergens, klebsiella* spp., *kluyvera* spp., *lactobacillus* spp., *leuconostoc* spp., *shewanella putrefaciens, pseudomonas* spp., *Enterobacter cloacae, listeria* spp., *aeromonas* spp., *clostridium* spp., or combinations thereof. In other embodiments, the microorganism may be *E. coli.*

In some embodiments, the multilayer film may demonstrate at least about 1 log CFU/g kill in a microorganism population. The multilayer film may demonstrate 1 log CFU/g kill in a microorganism population, 1.5 log CFU/g kill in a microorganism population, 2 log CFU/g kill in a microorganism population, 2.5 log CFU/g kill in a microorganism population, 3 log CFU/g kill in a microorganism population, 3.5 log CFU/g kill in a microorganism population, 4 log CFU/g kill in a microorganism population, 4.5 log CFU/g kill in a microorganism population, 5 log CFU/g kill in a microorganism population, 5.5 log CFU/g kill in a microorganism population, 6 log CFU/g kill in a microorganism population, 6.5 log CFU/g kill in a microorganism population, 7 log CFU/g kill in a microorganism population, 7.5 log CFU/g kill in a microorganism population, 8 log CFU/g kill in a microorganism population, 8.5 log CFU/g kill in a microorganism population, 9 log CFU/g kill in a microorganism population, or any range between these values.

In some embodiments, the multilayer film may demonstrate at least about 1 log CFU/g kill in *E. coli* population.

In some embodiments, the multilayer film may demonstrate 1 log CFU/g to 8 log CFU/g kill in *E. coli* population. The multilayer film may demonstrate 1 log CFU/g kill in *E. coli* population, 1.5 log CFU/g kill in *E. coli* population, 2 log CFU/g kill in *E. coli* population, 2.5 log CFU/g kill in *E. coli* population, 3 log CFU/g kill in *E. coli* population, 3.5 log CFU/g kill in *E. coli* population, 4 log CFU/g kill in *E. coli* population, 4.5 log CFU/g kill in *E. coli* population, 5 log CFU/g kill in *E. coli* population, 5.5 log CFU/g kill in *E. coli* population, 6 log CFU/g kill in *E. coli* population, 6.5 log CFU/g kill in *E. coli* population, 7 log CFU/g kill in *E. coli* population, 7.5 log CFU/g kill in *E. coli* population, 8 log CFU/g kill in *E. coli* population, 8.5 log CFU/g kill in *E. coli* population, 9 log CFU/g kill in *E. coli* population, or any range between these values.

In some embodiments, the multilayer film exhibits a total viable count (TVC) of microorganisms of 1 log CFU/g or less. The multilayer film may have a TVC of microorganisms of 1 log CFU/g, 0.9 log CFU/g, 0.8 log CFU/g, 0.7 log CFU/g, 0.6 log CFU/g, 0.5 log CFU/g, 0.4 log CFU/g, 0.3 log CFU/g, 0.2 log CFU/g, 0.1 log CFU/g, 0.05 log CFU/g, 0.01 log CFU/g, or any range between these values.

A method of reducing the microbial contamination of a product in a package may be disclosed. The method may include providing a multilayer film. In some embodiments, the multilayer film may have a sealant layer with a polymeric substrate, a lauroyl arginate moiety, and an ethylene methacrylic acid copolymer.

In some embodiments, the method may include forming a package from the multilayer film. The products may be packaged in the multilayer film in a variety of ways known to those of skill in the art such that the product is at least partially surrounded by the multilayer film. Thus, in some embodiments, the multilayer film can be packaged using vacuum packaging, shrink wrapping, modified atmosphere packaging, bags, pouches, films, trays, bowls, clam shell packaging, web packaging, and the like. Such methods are well known to those of ordinary skill in the packaging art.

In some embodiments, the method may include packaging a product in the multilayer film. The lauroyl arginate moiety may be present in a sealant layer of the multilayer film in an amount of about 0.01% to about 15% by weight of the sealant layer. The ethylene methacrylic acid copolymer may be present in the sealant layer of the multilayer film in an amount of about 1% to about 20% by weight of the sealant layer.

As set forth in detail herein above, the multilayer film may be used to package a wide variety of foodstuffs, including meat products. In addition, the multilayer films may also be used to provide an antimicrobial surface in a variety of applications, such as in medical environments and equipment and in food packaging. One of ordinary skill in the art would appreciate that the presently disclosed subject matter may be used in accordance with a wide variety of products and thus is not limited to the products set forth above.

Another embodiment of the invention may be a packaged product. The packaged product may include a product. The package product may include a multilayer film at least partially surrounding the product. The multilayer film may have a sealant layer. The sealant layer may have a polymeric substrate, a lauroyl arginate moiety present in an amount of about 0.01% to about 15% by weight of the sealant layer, and an ethylene methacrylic acid copolymer present in an amount of about 1% to about 20% by weight of the sealant layer.

As set forth herein above in detail, the disclosed film comprises a sealant layer comprising an LAE moiety incorporated therein. Accordingly, the antimicrobial properties associated with the LAE moiety are integrated within the film. As a result, when the film contacts a product, the antimicrobial agent is thereby used to kill microbial agents. In some embodiments the kill rate of the microbial film is about 90% to about 99.99%. As illustrated below, a kill of 90% to 100% of the microbes is desired, and there can be a change of 0.1 to 4.0 or greater log reduction versus an untreated control (depending on the level of contamination start). Thus, when the product is a food product, spoilage can be reduced or eliminated. In general, improvements in the spoilage characteristics of food products lead to retention of desirable color, flavor, and nutrients with minimal formation of undesirable compounds. Economic benefits of reduced spoilage include cost reduction related to capital, energy, and packaging material savings, and a longer shelf life.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

EXAMPLES

Example 1

Several polymeric substrates and EMAA copolymers were used for testing. Table 1 below lists the resin identification for these various.

Sixteen samples of different blended melts were produced to improve torque and improve processing of LAE. The blend composition of the prepared samples 1-16 are listed in Table 2 below.

TABLE 2

|  | Component 1 | Component 2 | Component 3 |
|---|---|---|---|
| Sample 1 | VLDPE 97% | LAE 3% |  |
| Sample 2 | VLDPE 87% | LAE 3% | EVA 10% |
| Sample 3 | VLDPE 92% | LAE 3% | EVA 5% |
| Sample 4 | VLDPE 77% | LAE 3% | EVA 20% |
| Sample 5 | VLDPE 87% | LAE 3% | EVA 2 10% |
| Sample 7 | VLDPE 87% | LAE 3% | EMA 10% |
| Sample 8 | VLDPE 87% | LAE 3% | EMAA-Na 10% |
| Sample 9 | VLDPE 87% | LAE 3% | EMAA 10% |
| Sample 10 | VLDPE 87% | LAE 3% | EMAA/PB 10% |
| Sample 11 | VLDPE 92% | LAE 3% | EMAA 5% |
| Sample 12 | VLDPE 77% | LAE 3% | EMAA 20% |
| Sample 13 | VLDPE 87% | LAE 3% | LLDPE 10% |
| Sample 14 | VLDPE 87% | LAE 3% | EMAA-Zn/PA 10% |
| Sample 15 | VLDPE 87% | LAE 3% | EMA 2 10% |
| Sample 16 | VLDPE 87% | LAE 3% | EVA 3 10% |

All of the samples were tested for improved torque using an Intellitorque Brabender® Plastogram. The samples were prepared by blending 47 g of blends seen in Table 2. The carrier resin VLDPE and the active (Component 3) were added first and heated to 200 C until uniformly melted. The torque was given time to come to equilibrium, about 5 minutes, before the LAE was slowly added in small increments until the desired percentage was achieved. Once all the was added to the blender the system was run until equilibrium was reached again, about 15 minutes. The difference in torque after the LAE was added and before the LAE was added was recorded as the change in torque.

TABLE 1

| Indication in Table | General | Vendor | Tradename | Content | MFR | Density | Moisture content |
|---|---|---|---|---|---|---|---|
| VLDPE | VLOPE | DOW | Affinity PL1280G |  | 6 | 0.9 |  |
| VLDPE 2 | VLDPE | DOW | Affinity PL1281G |  | 6 | 0.9 |  |
| VLDPE 3 | VLDPE | DOW | XUS 61520.15L |  | 0.5 | 0.903 |  |
| VLDPE4 | VLDPE | DOW | Affinity PL1850G |  | 3 | 0.902 |  |
| LAE | LAE | Vedeqsa | M irenat-P/100 |  |  | 1.1 | 24% |
| EVA | EVA | Celanese Chemicals | Ateva 2861A | 27% | 6 | 0.949 |  |
| EVA2 | EVA | Westlake | EF532AA | 12% | 8 | 0.933 |  |
| EVA3 | EVA |  | LD768 | 26.20% | 2.3 | 0.952 |  |
| EVA4 | EVA | Westlake Chemical | EB524AA | 14.50% | 3.5 | 0.934 |  |
| EMA | EMA | ExxonMobil | Optema TC11O | 21.50% | 2 | 0.942 |  |
| EMA2 | EMA |  | TC110 | 21.50% | 2 | 0.943 |  |
| EMAA | EMAA | DuPont | Nucrel 1202 | 12% | 1.5 | 0.94 |  |
| EMAA/PB | EMAA/P8 | DuPont | Appeel 720811 |  | 6.9 | 0.93 |  |
| EMAA-Zn/PA | EMAA-Zn/PA | DuPont | Surlyn AM7927 | 11% | 11.5 | 0.98 |  |
| EMAA-Na | EMAA-Na | DuPont | Surlyn 1601 |  | 1.3 | 0.94 |  |
| LLDPE | LLDPE-Fluoropolymer | Ampacet | 100458 |  | 2.3 | 0.93 |  |
| LLDPE 2 | LLDPE | ExxonMobil | Ll3003.39 |  | 3.2 | 0.918 |  |
| LLDPE 3 | LLDPE | DOW | Dowlex 2045.03 |  | 1.1 | 0.92 |  |
| LLDPE 4 | LLDPE | ExxonMobil | Exceed 1012HA |  | 1 | 0.912 |  |
| PVDC-Ma | PVDC-MA | DOW | Saran 806 |  | 1.7 |  | 0.05% |
| COC | COC-ENB | Topas Advanced Polymers | TOPAS 9903D-10 |  | 1 | 0.974 |  |
| SRBT | Release Agent | Sigma-Aldrich | S1876 |  |  |  |  |

Sample 1, VLDPE and LAE, was run as a comparison example. Change in torque values are shown in Table 3.

TABLE 3

|  | Component 1 | Component 2 | Component 3 | Delta Torque [Nm] |
| --- | --- | --- | --- | --- |
| Sample 1 | VLDPE 97% | LAE 3% |  | 0.4 |
| Sample 2 | VLDPE 87% | LAE 3% | EVA 10% | 1.3 |
| Sample 3 | VLDPE 92% | LAE 3% | EVA 5% | 0.2 |
| Sample 4 | VLDPE 77% | LAE 3% | EVA 20% | 1.6 |
| Sample 5 | VLDPE 87% | LAE 3% | EVA2 10% | 0.5 |
| Sample 7 | VLDPE 87% | LAE 3% | EMA 10% | 0 |
| Sample 8 | VLDPE 87% | LAE 3% | EMAA-Na 10% | −0.5 |
| Sample 9 | VLDPE 87% | LAE 3% | EMAA 10% | 1 |
| Sample 10 | VLDPE 87% | LAE 3% | EMAA/PB 10% | 0.2 |
| Sample 11 | VLDPE 92% | LAE 3% | EMAA 5% | 0.7 |
| Sample 12 | VLDPE 77% | LAE 3% | EMAA 20% | 1 |
| Sample 13 | VLDPE 87% | LAE 3% | LLDPE 10% | 0 |
| Sample 14 | VLDPE 87% | LAE 3% | EMAA-Zn/PA 10% | 0.3 |
| Sample 15 | VLDPE 87% | LAE 3% | EMA2 10% | 0 |
| Sample 16 | VLDPE 87% | LAE 3% | EVA3 10% | −0.1 |

Delta torque was calculated by subtracting the initial torque from the final torque. Positive number represents a final torque higher than the initial torque. Overall, samples that included EMAAs and EVAs (MFR>6) based materials showed a positive change of torque except the sodium neutralized EMAA. Samples 7, 8, 13, 15 and 16 showed no improvement in torque.

Six samples were produced in a full multi-layer structure to test for log reduction and improved processing of LAE. The film formulation is shown below in Table 4.

Film 1 was extruded as a comparison example and does not contain any LAE. Film 4 was extruded as a LAE comparison example that does not contain any EMAA or EVA to improve processing.

TABLE 5

|  | Film 1 | Film 2 | Film 3 | Film 4 | Film 5 | Film 6 |
| --- | --- | --- | --- | --- | --- | --- |
| RPMs | 9 | 9 | 8 | Could not Extrude | 9 | 7 |
| AMPS (%) | 24.6 | 50.7 | 20.2 |  | 20 | 43.4 |
| Head Pressure (psi) | 1800 | 2500 | 1300 |  | 1500 | 1900 |

As seen in Table 5 above, films 2, 3, 5, and 6 showed improved torque over Film 4. Film 1 was produced to show when additives like EMAA are added to the structure the torque and head pressure are similar to the torque and head pressure of a structure without LAE. In conclusion, all structures showed improvement over Film which contains LAE in the polymeric substrate without additives.

A 2×2 inch tape well on each test film (Film 1-10 prepared in Example 2) was created by cutting a 2-inch by 2-inch section from a strip of vinyl tape and applying the tape to the antimicrobial film sample. The film was secured to a petri dish, 1 mL of stock inoculum was inoculated into each film. Another 2×2 piece of the same film sample was added over the first film sample and inoculum in the petri dish. The inoculated films were incubated at 4 C for 5 days in high humidity sealed pouch and plated to determine bacterial population at Day 0 for Film 1, and Day 1 and Day 5 for all

TABLE 4

| Formula: | Layer 1 | Layer 2 | Layer 3 | Layer 4 | Layer 5 | Layer 6 | Layer 7 |
| --- | --- | --- | --- | --- | --- | --- | --- |
| Film 1 | VLDPE 2 80% LLDPE 2 20% | VLDPE 3 70% EVA 30% | EVA 4 | PVDC-MA | EVA | VLDPE 3 70% EVA 4 30% | VLDPE 4 80% LLDPE 3 20% |
| Film 2 | VLDPE 87% EMAA 10% LAE 3% | VLDPE 3 70% EVA 30% | EVA 4 | PVDC-MA | EVA | VLDPE 3 70% EVA 4 30% | VLDPE 4 80% LLDPE 3 20% |
| Film 3 | VLDPE 85% EMAA 10% LAE 5% | VLDPE 3 70% EVA 30% | EVA 4 | PVDC-MA | EVA | VLDPE 3 70% EVA 4 30% | VLDPE 4 80% LLDPE 3 20% |
| File4 | VLDPE 78% LLDPE 4 18% LAE 3% | VLDPE 3 70% EVA 30% | EVA 4 | PVDC-MA | EVA | VLDPE 3 70% EVA 4 30% | VLDPE 4 80% LLDPE 3 20% |
| FIim s | VLDPE 87% EVA 10% LAE 3% | VLDPE 3 70% EVA 30% | EVA 4 | PVDC-MA | EVA | VLDPE 3 70% EVA 4 30% | VLDPE 4 80% LLDPE 3 20% |
| Film 6 | VLDPE 70% EMAA 10% LLDPE 4 16% LAE4% | VLDPE 3 70% EVA 30% | EVA 4 | PVDC-MA | EVA | VLDPE 3 70% EVA 4 30% | VLDPE 4 80% LLDPE 3 20% |
| Film 7 | VLDPE 2 65% LLDPE 2 20% EMAA 10% LAE 5% | VLDPE 3 60% EVA 4 30% COC 10% | EVA 4 | PVDC-MA | EVA | VLDPE 3 70% EVA 4 30% | VLDPE 4 80% LLDPE 3 20% |
| Film 8 | VLDPE 2 65% LLDPE 2 20% EMAA 10% LAE 5% | VLDPE 3 60% EVA 4 40% | EVA 4 | PVDC-MA | EVA | VLDPE 3 70% EVA 4 30% | VLDPE 4 80% LLDPE 3 20% |
| Film 9 | VLDPE 2 63% LLDPE 2 20% EMAA 10% LAE 5% SRBT 2% | VLDPE 3 60% EVA 4 40% | EVA 4 | PVDC-MA | EVA | VLDPE 3 70% EVA 4 30% | VLDPE 4 80% LLDPE 3 20% |
| Film 10 | VLDPE 2 65% LLDPE 2 20% EMAA 10% LAE 4% SRBT 1% | VLDPE 3 60% EVA 4 30% COC 10% | EVA 4 | PVDC-MA | EVA | VLDPE 3 70% EVA 4 30% | VLDPE 4 80% LLDPE 3 20% | film samples. The inoculum is recovered from the petri dish by adding 9 mL 0.1% buffered peptone water aseptically to the film sample in the petri dish. The total aerobic plate count in purge is enumerated using Aerobic Plate Count 3M Petri Film.

TABLE 6

| Sample ID | Time/ Days | Avg. Log CFU/g | STD | Log CFU Reduction |
|---|---|---|---|---|
| Film 1 | 0 | 1.93 | 0.03 | |
| Film 1 | 1 | 3.38 | 0.14 | |
| Film 1 | 5 | 7.35 | 0.21 | |
| Film 2 | 1 | 3.29 | 0.01 | 0.09 |
| Film 2 | 5 | 6.89 | 0.09 | 0.46 |
| Film 3 | 1 | 1.5 | 0.71 | 1.88 |
| Film 3 | 5 | 2.76 | 1.01 | 4.59 |
| Film 4 | 1 | 1.93 | 0.11 | 1.45 |
| Film 4 | 5 | 3.57 | 0.17 | 3.78 |
| Film 5 | 1 | 1.45 | 0.21 | 1.93 |
| Film 5 | 5 | 4.4 | 1.48 | 2.95 |
| Film 6 | 1 | 2.99 | 0.07 | 0.39 |
| Film 6 | 5 | 6.52 | 0.31 | 0.83 |
| Film 7 | 0 | 1.84 | 0.01 | 0 |
| Film 7 | 5 | 7.12 | 0.02 | 0.62 |
| Film 8 | 0 | 1.84 | 0.01 | 0 |
| Film 8 | 5 | 5.55 | 0.41 | 2.19 |
| Film 9 | 0 | 1.84 | 0.01 | 0 |
| Film 9 | 5 | 6.07 | 0.65 | 1.67 |
| Film 10 | 0 | 1.84 | 0.01 | 0 |
| Film 10 | 5 | 6.43 | 0.36 | 1.31 |

Prophetic Example 1

Lauroyl-L-arginine (LAE) contains an amine (—NRRH) group connecting the lauryl group to the arginine, and an ester (—COOC—). Both these functional groups could serve as possible reaction sites if a polar/charged molecule was present.

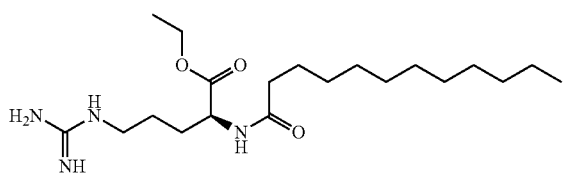

Ethyl N-α-Lauroyl-L-Arginate

The additives that show effective improvements in processability of LAE in polyethylene (PE) contain either charged or polar structures. The most effective material tested was ethylene methacrylic acid copolymer (EMAA). Ethylene-vinyl acetate also showed improvements in processing. It is hypothesized that the —COOH functional group on the EMAA, a highly polar group, and the —COOC— group on the EVA reacts with the amine or ester group of the LAE. Another hypothesis is that the polar group of the EMAA/EVA complexes and emulsifies the LAE allowing for easier processing.

This complex (either via reaction or emulsification) behaves as a tie between the LAE and PE—the charged group of the EMAA/EVA complexes with the LAE while the uncharged ethylene of the EMAA/EVA blends into the PE.

Ethyl methacrylate and neutralized EMAAs do not show as marked an improvement in processing LAE in PE. This would indicate that neither the ester group of the EMA, nor the $COO^-X^+$ ($X^+$ indicating a neutralizing agent e.g. $Na^+$) of the neutralized EMAA are polar/charged enough to complex effectively with the LAE's amine group or ester group.

In-house testing has also shown that a minimum amount of LAE needs to be present relative to the amount of processing aid—if not; the LAE will be hampered from migrating through the sealant layer to the food. Samples of film with 10% EMAA and 3% LAE did not show effective microbial kill over 5 days compared to the control (0.46 log kill for 10% EMA/3% LAE compared to control of 0 log kill). However, when the amount of LAE was increased to 10% EMAA and 5% LAE, the microbial kill over 5 days increased to 4.59 log kill.

Charged compounds such as silica have also shown efficacy in aiding the processing of LAE in PE. Improved processing was noted when LAE was compounded with silica at a ratio of 3.75:1. However, if the hypothesis is correct, there will exist a minimum concentration of LAE necessary relative to concentration of silica to see improved processing and efficient LAE antimicrobial activity.

If either hypothesis stands true, other non-neutralized acid copolymers and other charged compounds would show similar effect to the EMAA. Other effective compounds could include: ethylene/vinyl acetate/carbon monoxide (EVA/CO) copolymer, ethylene/n-butyl acrylate/carbon monoxide copolymer, ethylene/butyl acrylate copolymer, ethylene and ethyl acrylate copolymer, 3-(2,4-Dimethylphenyl)acrylic acid, 2-Dimethylaminomethyl-acrylic acid, trans-3-(2-pyridyl)acrylic acid, (E)-3-(3-Isopropoxyphenyl) acrylic acid, 5-Nitrofuran-2acrylic acid, Trans-3-(4-Methoxybenzoyl)acrylic acid, 2-(Trifluromethyl)acrylic acid, 2-(Bromomethyl)acrylic acid, trans-3-(4-Chlorobenzoyl)acrylic acid, trans-3-(3-Thienyl)acrylic acid, 3-(1-Methyl-1H-pyrrol-2-yl)acrylic acid, (2e)-3-(2,6-dimethylcyclohex-3-2-enyl)acrylic acid, 3-(4-Methoxyl-1-napthyl) acrylic acid, (2E)-3-[2-(Dimethylamino)pyrimidin-5-yl] acrylic acid, 3-(4-Methyl benzoyl)acrylic acid, and all other acrylic acids.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A method of making a multilayer film comprising:
   providing a polymeric substrate, a lauroyl arginate moiety, and an ethylene methacrylic acid copolymer;
   mixing the lauroyl arginate moiety, the ethylene methacrylic acid copolymer, and the polymeric substrate to make a blend;
   extruding the blend of polymeric substrate, lauroyl arginate moiety, and ethylene methacrylic acid copolymer through a die to form an extrudate; and
   forming a multilayer film;
   wherein the lauroyl arginate moiety is present in a sealant layer of the multilayer film in an amount of about 0.01% to about 15% by weight of the sealant layer, and the ethylene methacrylic acid copolymer is present in the sealant layer of the multilayer film in an amount of about 1% to about 20% by weight of the sealant layer, wherein the sealant layer of the multilayer film comprises up to 5% by weight sorbitol.

2. The method of claim 1, further comprising casting the extrudate onto a chilled roller so that the extrudate cools to form a cast film or orienting the extrudate as it cools and solidifies such that a film is formed.

3. A method of making a multilayer film comprising:
providing a polymeric substrate, a lauroyl arginate moiety, and an ethylene methacrylic acid copolymer;
mixing the lauroyl arginate moiety, the ethylene methacrylic acid copolymer, and the polymeric substrate to make a blend;
extruding the blend of polymeric substrate, lauroyl arginate moiety, and ethylene methacylic acid copolymer through a die to form an extrudate; and
forming a multilayer film;
wherein the lauroyl arginate moiety is present in a sealant layer of the multilayer film in an amount of about 0.01% to about 15% by weight of the sealant layer, and the ethylene methacrylic acid copolymer is present in the sealant layer of the multilayer film in an amount of about 1% to about 20% by weight of the sealant layer,
further comprising measuring the initial torque of the polymeric substrate before the mixing of the lauroyl arginate moiety and ethylene methacrylic acid copolymer with the polymeric substrate and measuring the final torque after mixing the lauroyl arginate moiety, ethylene methacrylic acid copolymer, and the polymeric substrate, wherein the initial torque is lower than the final torque.

4. The method of claim 1, where the polymeric substrate comprises at least one member selected from the group consisting of polyolefin, polyolefin copolymers, polyester, polyamide, polystyrene, and polycarbonate.

5. The method of claim 1, where the lauroyl arginate moiety comprises at least one member selected from the group consisting of ethyl lauroyl arginate hydrochloride salt, lauroyl arginate monolaurate, lauroyl arginate palmitate, lauroyl arginate stearate, lauroyl arginate lactate, lauroyl arginate citrate, lauroyl arginate oleate, ethyl lauroyl arginate benzoate, ethyl lauroyl arginate acetate, ethyl lauroyl arginate hydrogen sulfate, and ethyl lauroyl arginate phosphonate.

6. The method of claim 1, wherein the multilayer film exhibits a total viable count (TVC) of microorganisms of 1 log CFU/g or less.

7. The method of claim 1, wherein the multilayer film demonstrates at least about 1 log CFU/g kill in a microorganism population.

8. The method of claim 1, wherein the multilayer film demonstrates at least about 1 log CFU/g kill in *E. coli* population.

9. The method of claim 1, wherein the polymeric substrate is devoid of at least one member selected from the group consisting of water soluble, partially water-insoluble, and water-swellable polymers.

10. The method of claim 1, wherein the multilayer film further comprises an abuse layer comprising at least one member selected from the group consisting of polyester, polyamide, polyethyleneterephthalate (PET), polyurethane, polystyrene, and polyolefin.

11. The method of claim 1, wherein the multilayer film further comprises a barrier layer comprising at least one member selected from the group consisting of ethylene vinyl alcohol (EVOH), nylon, polyvinylidene chloride (PVDC), polyethylene carbonate, polyamide, polyester, polyvinyl alcohol, acrylonitrile-butadiene copolymer, polyalkylene carbonate, polyacrylonitrile, polypropylene homopolymer or copolymer having a melting point of greater than about 145° C. (as measured by DSC), and polyethylene having a density greater than about 0.95 g/cc.

12. The method of claim 1, wherein the multilayer film further comprises a core layer comprising at least one member selected from the group consisting of, ethylene/C3-C8a-olefin copolymer, ethylene/ethylenically unsaturated ester copolymer e.g., ethylene/butyl acrylate copolymer), ethylene/ethylenically unsaturated acid copolymer (e.g., ethylene/(meth)acrylic acid copolymer), and ethylene/vinyl acetate copolymer.

13. A method of making a multilayer film comprising:
providing a polymeric substrate, a lauroyl arginate moiety, and an ethylene methacrylic acid copolymer;
mixing the lauroyl arginate moiety, the ethylene methacrylic acid copolymer, and the polymeric substrate to make a blend;
extruding the blend of polymeric substrate, lauroyl arginate moiety, and ethylene methacrylic acid copolymer through a die to form an extrudate; and
forming a multilayer film;
wherein the lauroyl arginate moiety is present in a sealant layer of the multilayer film in an amount of about 0.01% to about 15% by weight of the sealant layer, and the ethylene methacrylic acid copolymer is present in the sealant layer of the multilayer film in an amount of about 1% to about 20% by weight of the sealant layer, wherein the multilayer film further comprises a tie layer in direct contact with the sealant layer, the tie layer comprising from 1% to 10% by weight of a cyclic olefin copolymer.

14. The method of claim 13, wherein cyclic olefin copolymer is an ethylene/norbornene copolymer.

15. A method of reducing the microbial contamination of a product in a package comprising:
providing a multilayer film, the multilayer film comprising:
a sealant layer with a polymeric substrate, a lauroyl arginate moiety, and an ethylene methacrylic acid copolymer;
forming a package from the multilayer film;
packaging the product in the multilayer film,
wherein the lauroyl arginate moiety is present in a sealant layer of the multilayer film in an amount of about 0.01% to about 15% by weight of the sealant layer, and the ethylene methacrylic acid copolymer is present in the sealant layer of the multilayer film in an amount of about 1% to about 20% by weight of the sealant layer, wherein the sealant layer of the multilayer film comprises up to 5% by weight sorbitol.

16. The method of claim 15, where the polymeric substrate comprises at least one member selected from the group consisting of polyolefin, polyolefin copolymers, polyester, polyamide, polystyrene, and polycarbonate.

17. The method of claim 15, where said lauroyl arginate moiety comprises at least one member selected from the group consisting of ethyl lauroyl arginate hydrochloride salt, lauroyl arginate monolaurate, lauroyl arginate palmitate, lauroyl arginate stearate, lauroyl arginate lactate, lauroyl arginate citrate, lauroyl arginate oleate, ethyl lauroyl arginate benzoate, ethyl lauroyl arginate acetate, ethyl lauroyl arginate hydrogen sulfate, ethyl lauroyl arginate phosphonate, and combinations thereof.

18. The method of claim 15, wherein the polymeric substrate is devoid of at least one member selected from the group consisting of water soluble, partially water-insoluble, and water-swellable polymers.

19. A packaged product comprising:
   a product; and
   a multilayer film at least partially surrounding the product,
wherein the multilayer film comprises a sealant layer comprising a polymeric substrate, a lauroyl arginate moiety present in an amount of about 0.01% to about 15% by weight of the sealant layer, and ethylene methacrylic acid copolymer present in an amount of about 1% to about 20% by weight of the sealant layer, wherein the sealant layer of the multilayer film comprises up to 5% by weight sorbitol.

* * * * *